Feb. 13, 1968  H. R. WILLIAMS  3,368,241
FUNCTIONALLY CONTROLLED ELECTRO-SERVO
VARIABLE EXTRUSION APPARATUS
Filed Jan. 18, 1966  3 Sheets-Sheet 1
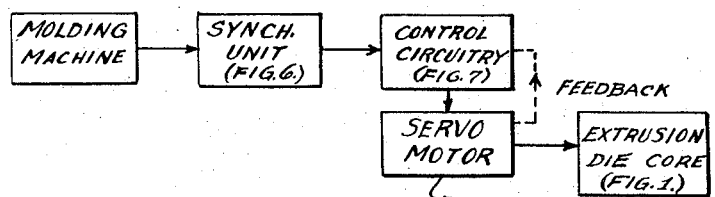
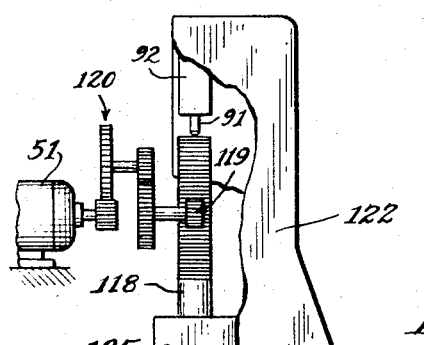
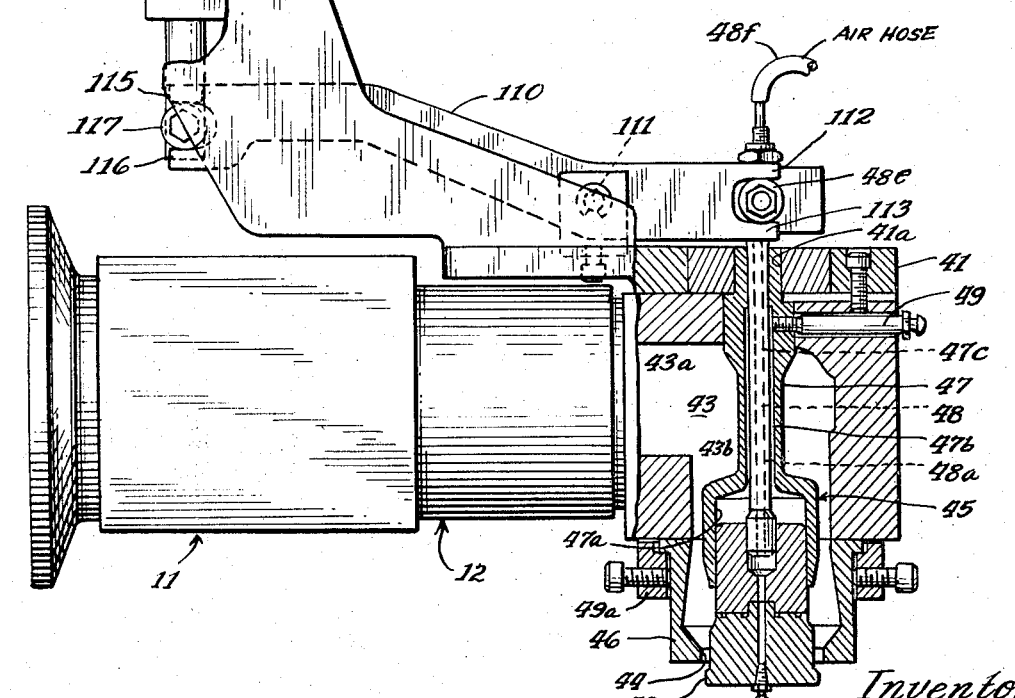
Inventor
Henry R. Williams
By Petherbridge, O'Neill & Aubel
Attys.

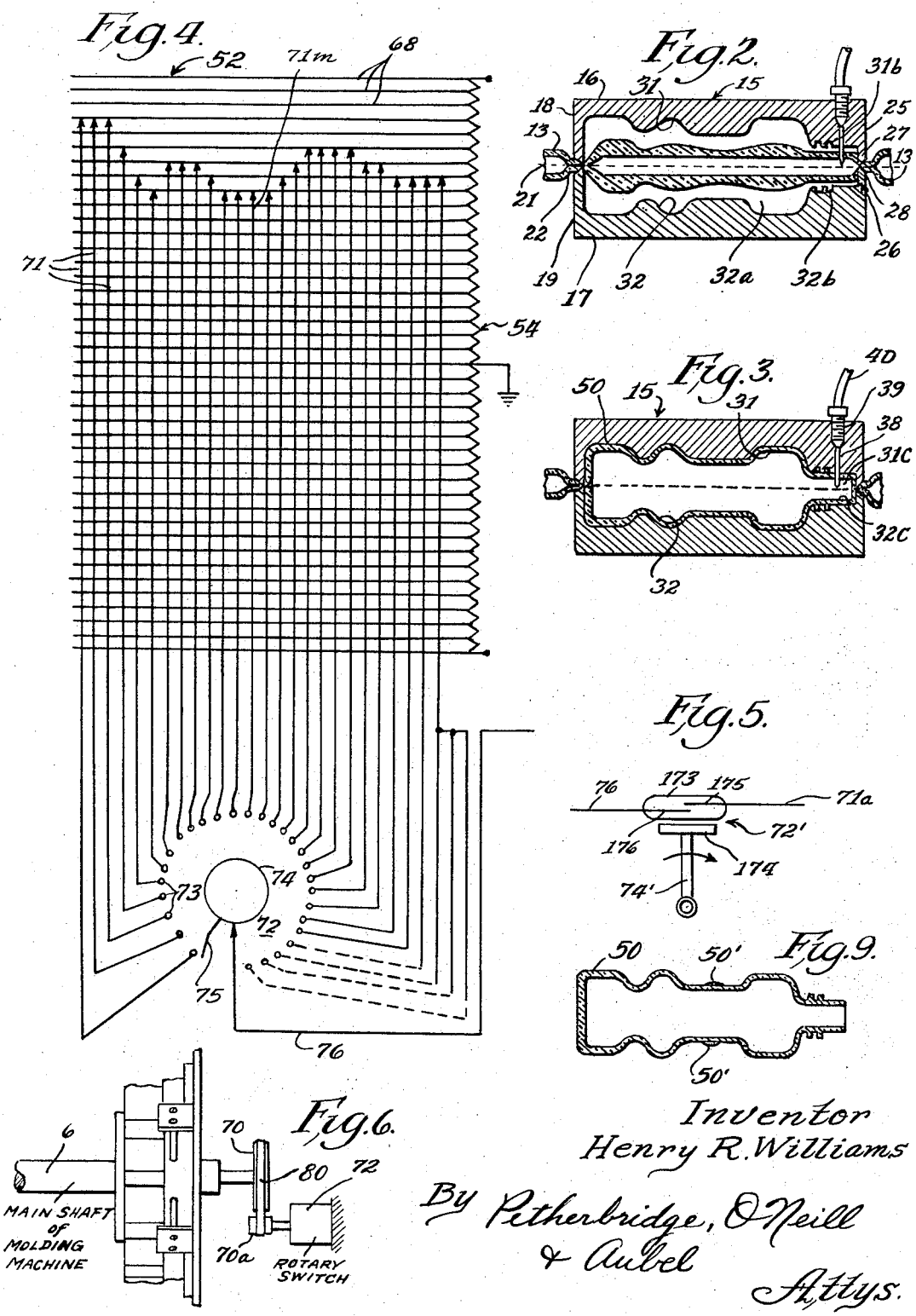

Inventor
Henry R. Williams
By Petherbridge, O'Neill & Aubel
Attys.

United States Patent Office 3,368,241
Patented Feb. 13, 1968

3,368,241
FUNCTIONALLY CONTROLLED ELECTRO-SERVO
VARIABLE EXTRUSION APPARATUS
Henry R. Williams, Fullerton, Calif., assignor to Continental Can Company, Inc., New York, N.Y., a corporation of New York
Filed Jan. 18, 1966, Ser. No. 521,361
7 Claims. (Cl. 18—14)

ABSTRACT OF THE DISCLOSURE

The invention relates to an extrusion apparatus for extending material such as plastic for molding articles such as bottles having walls of varied cross section. The apparatus includes electronic control circuitry which is energized by a function generator in accordance with preselected parameters to activate a driving means for moving the die core and orifice means relative to one another as the material is being extruded. Feedback means are provided for generating feedback signals in response to the activation of the driving means and for coupling the feedback signals to the control circuitry to control the driving means and thereby provide the desired, precise and variable wall thickness for the article being extruded.

---

This invention relates to new and useful improvements in extrusion apparatus and, more particularly, to an extrusion apparatus for extruding a tube of material such as plastic, which tube has a variable programmed wall thickness. The tube thus extruded is then utilized to blow-mold an article to have selected variable wall thicknesses.

This invention is related to the apparatus shown and described in Patent 3,019,481 to Negoro, for Variable Orifice Extrusion Die, granted on Feb. 6, 1962, and Patent 2,784,452 to Ruekberg et al., for Vertical Machine With Radially Moving Molds for Forming Hollow Articles, granted on Mar. 12, 1957; both of these patents are assigned to the same assignee as the present invention. The disclosures of aforementioned Reukberg et al. and Negoro patents are hereby incorporated by reference in this specification.

It is to be understood, of course, that the design of molding machines has advanced significantly since the development of the Ruekberg et al. or Negoro inventions; however, the broad principle of providing a machine having molds mounted for rotation about an axis is still currently applicable. Machines such as disclosed in Ruekberg et al. and Negoro patents operate to present molds successively to receive an extruded tube. The molds close about, seal, and cut off sections of the extruded tube. After a given section of the tube is sealed off, air is injected into the tube to expand the walls of the tube within the molds to conform to the shape of the mold cavity.

The extrusion apparatus disclosed in the Negoro patent includes a variable orifice with an associated movable and positionable core or head. The orifice and the associated head are constructed and arranged so that the thickness of the walls of the tubing may be varied by varying the position of the head within the orifice during the extrusion process to provide articles having walls of more uniform thickness. The head is positioned to permit more plastic to flow through the orifice to form those portions of the tubing which are to be expanded the most. The thicker portion of the tubing generally form those portions of the article walls having the largest dimensions, hence walls of more uniform thickness are obtained. However, heretofore it has not been possible to provide selectively variable control of the thickness of the walls of the tube throughout its length to assure that the walls of the article being molded have a desired optimum and variably selectable thickness.

Attempts have previously been made to vary the cross section of the tube in accordance with the configuration of the associated mold. However, prior to this invention, no means had been provided for programming the wall thickness of each tube section throughout the length of the section to provide articles of variable selected wall thickness. For example, when forming a bottle from a tube section, it may be necessary for stability that the lower end of the bottle be of maximum circumference. Accordingly, there will be a maximum expansion of the tube material utilized to form the lower end of the bottle, and hence an extreme thinning of the wall of the bottle at the periphery of its lower end. It is, therefore, highly desirable that the wall thickness of that portion of the extruded tube which is to be utilized in forming the periphery of the lower end of the bottle be increased. Further, the maximum weight of the fluid carried by the bottle is concentrated at the bottom and lower end of the bottle, hence the bottom and lower end of the bottle can advantageously be relatively thicker than the remaining article wall portions to properly support the weight of the contained fluid.

Frequently, and for various reasons, other parts of the bottle wall can advantageously be made of a greater than normal thickness. For example, a bottle often includes handles for supporting, handling or lifting the bottle; hence, the wall area to which the handle is attached may preferably be relatively thicker and, hence, stronger to support the total weight of the bottle and the contained fluid.

Accordingly, it is a principal object of the present invention to provide a programmable extrusion apparatus for selectively controlling the wall thickness of a tube to be utilized for forming the walls of an article.

Another object of the present invention is to provide a control system for an extrusion apparatus wherein the cross section of an extruded tube may be controllably varied as desired.

Still another object of the present invention is to provide an extrusion apparatus which includes a variably programmable function generator for programming a desired wall thickness of a molded article.

Yet another object of the present invention is to provide a means for readily programming an extrusion apparatus to adapt for making articles of different wall thickness or cross section.

Also, it has been found that the plastic extruded by the extrusion apparatus and, hence, the cross section of the walls of an extruded tube may vary with the environment, or the parameters of the plastic itself.

Accordingly, it is another object of the present invention to provide an extrusion apparatus, including a function generator, which can be readily and variably adjusted for controlling the cross section of the walls of the extruded tubes.

It is still another object of the present invention to provide a novel method comprising providing a discernible band on an article that is used as a reference for adjusting the extrusion apparatus.

Yet another object of the present invention is to provide a novel method of molding an article.

The foregoing and other objects, features and advantages of the invention will become apparent from the following, more particular, description of a preferred embodiment of the invention as illustrated in the accompanying drawings wherein like reference characters refer to like elements throughout and herein:

FIG. 1 is an elevational view of an extrusion die and head with portions of the die shown in cross section in order to more clearly illustrate the details thereof and also shows the gearing mechanism and pivot lever for driving the die core of the extrusion head;

FIG. 2 is a view in cross section showing the initial relation of a mold with respect to a section of the extruded plastic tube received from the extruder;

FIG. 3 is a view in cross section similar to FIG. 2 showing the cross section of the plastic tube after it has been expanded internally to conform to the configuration of the mold cavity;

FIG. 4 is a schematic view of an electrical function generator and a rotary switch used in the control circuitry of the invention;

FIG. 5 is an enlarged view showing one of the reed contacts or switches utilized in the rotary switch of FIG. 4;

FIG. 6 is a fragmentary schematic view of the machine with which the present invention may be utilized; and, more particularly, FIG. 6 shows a portion of the machine shown in FIG. 2 of the above-mentioned Negoro patent;

Figure 7:
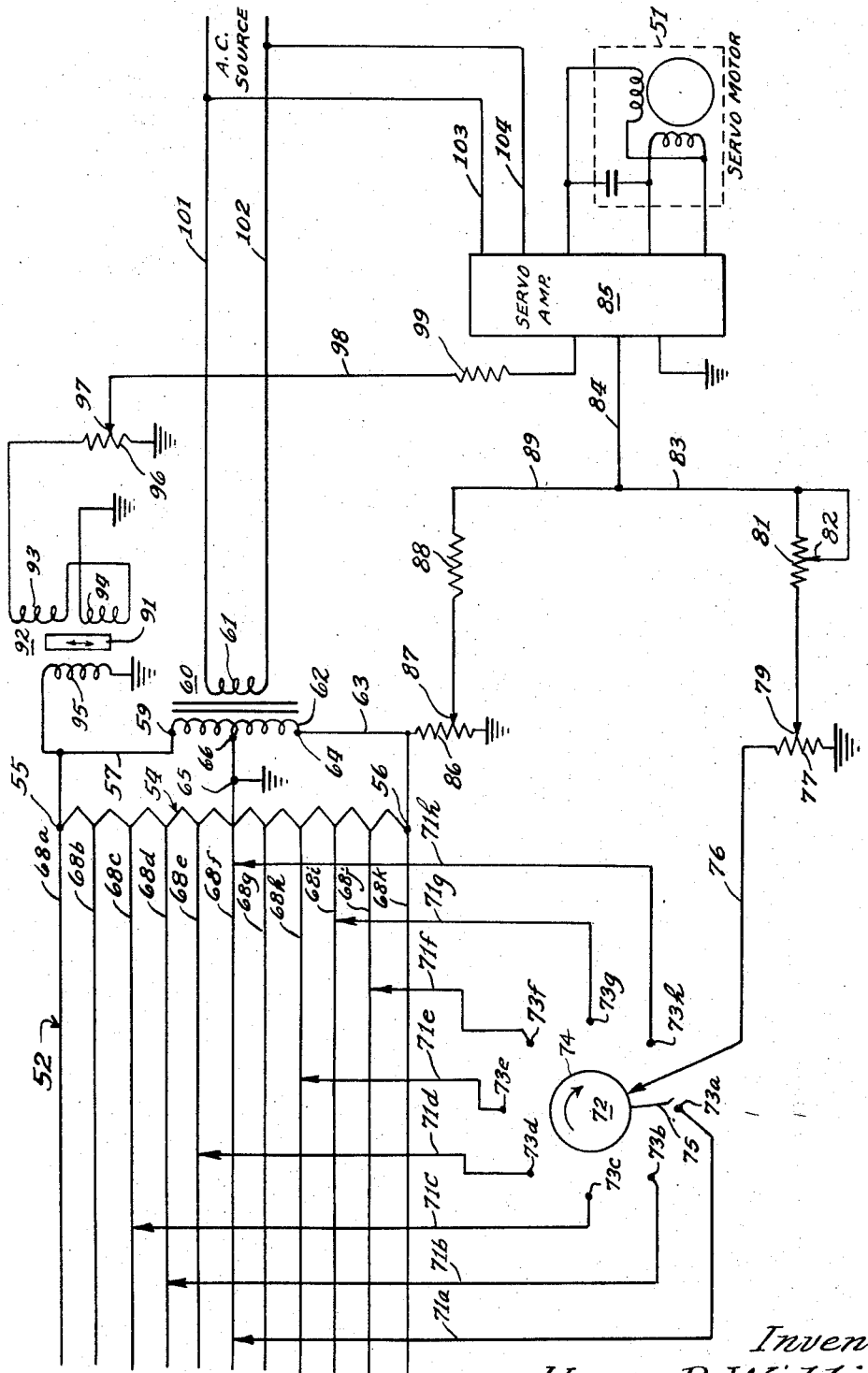
FIG. 7 is a schematic diagram of the control circuit of the invention showing the function generator of FIG. 5 in abbreviated form.

FIG. 8 discloses a flow or block diagram useful in explaining the operation of the invention; and, FIG. 9 shows a bottle formed by the apparatus of the invention and indicates a centering band utilized in adjusting the apparatus of the invention.

Since a complete disclosure of a general type of molding machine with which the present invention may be utilized is found in the above-mentioned Ruekberg et al. and Negoro patents, a description thereof need not be repeated herein. Hence, this invention will be described in detail and its structural relation, particularly to the embodiment of the machine shown in the Negoro patent, will become clear from the following description and the foregoing drawings.

Refer initially to FIG. 1 which illustrates generally an extruder 11 for plastics which suitably mounted in cooperating relation with the mold assembly carrier, not shown. Since the specific construction of the extruder 11 and the mold assembly carrier do not, per se, form a part of the present invention, they will be described only generally. The extruder 11 includes an extrusion head 12 which continuously extrudes a plastic tubing or tube 13, as indicated in FIG. 2. The extrusion head 12 is arranged to accommodate a variable orifice extrusion die 45. The extrusion head 12 is so located that the mold 15, which is to form the article, and, more particularly, the mold halves 16 and 17 (see FIGS. 2 and 3) are open as they pass on opposite sides of the extrusion head 12. Note that in actual practice the mold halves 16 and 17 are rotated 90 degrees from that shown in FIGS. 2 and 3. When the mold 15 is in its plastic tube receiving position, one mold half 16 moves towards the other mold half 17 to grip the plastic tube 13 at two spaced points along its length, as shown in FIG. 2, and as will be explained in more detail hereinbelow.

As the mold halves 16 and 17 grip the tube, an air injection needle 38 passes through the tube 13, and once the mold halves have completely closed and sealed the opposite ends of the tube section, air, under pressure, is introduced into the tube 13. The tube material which is still soft from the extrusion process is then expanded, and the exterior of the expanded tube assumes the shape of the cavity of the mold.

In the machines disclosed in aforementioned Patents 2,784,452 and 3,019,481, a plurality of molds of the type of mold 15 shown in FIGS. 2 and 3 are equally spaced about a common main shaft 6 (FIG. 6) and rotated therewith in a common plane to a position for receiving plastics from extruder 11 through the extruder head 12 and the extrusion die 45.

Refer now to the specific construction of the mold 15. Mold half 16 includes an end wall 18 which is aligned with an end wall 19 of the mold half 17. Since the mold 15 shown in FIGS. 3 and 4 is the identical mold, for clarity in the drawings, the various element designating numerals are placed only on one of the two figures. The end wall 18 of mold half 16 has a tapered edge 21 which is arranged to close against a tapered edge 22 of the end wall 19 of mold half 17. As the mold half 16 is caused to move toward and abut the mold half 17, a section of a plastic tube 13 is clamped between the tapered edges 21 and 22, the result being that the plastic tube 13 is collapsed, sealed and severed at this point.

The other or opposite end wall 25 of the mold half 16 is aligned with the other or opposite end wall 26 of the mold half 17. The end wall 25 has a tapered edge 27 which is arranged to close against a tapered edge 28 of the end wall 26. As the mold half 16 is caused to move toward and abut the mold half 17, the tube 13 is thus also clamped between the tapered edges 27 and 28 so as to collapse and seal the tube 13 at a second point along its length.

As illustrated, the mold halves 16 and 17 of the present embodiment include a cavity for the formation of a bottle 50, see FIGS. 3 and 9. However, it is to be understood at the outset that a bottle is only one of many hollow articles which may be made utilizing the invention.

The mold cavity of the mold half 16 which is generally labeled 31 includes a body-defining portion 31a and a neck-defining portion 31b. The mold cavity of the mold half 17 is generally labeled 32 and includes a body-defining portion 32a and a neck-defining portion 32b. The neck-defining portions 31b and 32b have extensions 31c and 32c (see FIG. 3) which extend beyond the neck of the bottle being formed.

A needle 38 is carried by the mold half 16 and extends into the extension 32c of the cavity 32. The other end of needle 38 is connected through a fitting 39 of an air line 40 to a suitable source of compressed air, not shown. When the mold half 16 cooperates with the mold half 17 to clamp and seal the plastic tube 13 therebetween, the needle 38 penetrates the plastic tube 13. Compressed air is next forced into the plastic tube 13 between these two seals with the result that the plastic tube is internally expanded and forced into engagement with the outline of the molds 31 and 32, as shown in FIG. 3.

As mentioned above, the portions of the tube 13 which undergo the greatest expansion to form the finished plastic bottle 50 normally would undergo the greatest thinning of the wall during the molding process. As also mentioned above, it is often desirable that the lower wall and bottom portions of the finished bottle 50 be somewhat thicker and, hence, stronger than the upper wall portions of the finished bottle. Likewise, it may be desirable to strengthen other localized portions of the walls, such as when a handle is to be molded on the wall. The foregoing features and advantages of the invention will be considered in detail after other elements of the inventive system have been described.

The details of the extrusion head 12 and the extrusion die 45 will now be described in detail. The extrusion head 12 includes a body or housing 41 shown in cross section in FIG. 1. The body 41 has an inverted L-shaped passageway 43 formed therein which passageway is arranged to have one leg 43a communicate through the extrusion head 12 to receive plastic from the extruder 11. The other leg 43b of passageway 43 leads or opens into a variable orifice 44 which is of circular configuration.

An extrusion die, generally referred to by the numeral 45, is mounted in the leg 43b of passageway 43. The extrusion die 45 is formed primarily of a die shell 46, a mandrel 47 and a die core 48. The mandrel 47 which is in the form of an elongated tubular member is affixed in housing 41 by any suitable affixing means, not labeled, to extend throughout the length of the leg 43b of passageway 43. The lower end of mandrel 47 forms an enlarged tubular housing 47a. The mandrel 47 receives the die core 48 in an internal bore 47b, formed along the length of the mandrel 47. The upper portion of the mandrel 47 is tightly received in a bore 41a formed in housing 41. The connection between the housing 41 and the upper portion of the mandrel 47 is sealed by suitable gasket means, not numbered.

The die core 48 includes an elongated shank 48a which is guidedly received in the mandrel bore 47a for longitudinal sliding movement. A core piece 48b which is of a larger diameter than shank 48a is affixed as by screwing to the lower end of shank 48a. The core piece 48b is received in mandrel housing 47a. The core piece 48b includes a removable enlarged end portion 48c. The enlarged end portion 48c projects downwardly from the lower end of the mandrel 47 to a position slightly external to the orifice 44. When the die core 48 is moved, the enlarged end 48c effectively increases or decreases the size of the opening in orifice 44 to control the amount of plastic fed through or extruded through the orifice 44 during any given period.

The upper end of the die core 48 has a cam roller 48e mounted thereon, for purposes to be explained.

A grease fitting 49 is threadedly engaged in the upper end of mandrel 47. The die core 48 has an internal air passage 47c extending along its length, which receives air through an air hose 48f. The air passage 47c communicates with the pasage 48d formed in the core piece 48b and core piece end 48c. Air is continuously forced through hose 48f, air passages 47c and 48d and into the tube being extruded to maintain the tube 13 from collapsing inwardly.

A pivot lever 110 is mounted on the extrusion head 12 by a pivot pin 111. One end, the right hand, as oriented in FIG. 1, of the lever 110 is bifurcated to form two extensions 112 and 113 to straddle cam roller 48e mounted on die core 48. The other end of lever 110 is also bifurcated to form two extensions 115 and 116 to straddle a cam roller 117. The cam roller 117 is affixed to the lower rod end of a rack 118 of a rack and gear train assembly 120 mounted on a frame 122 on the housing 41. The rack 118 is driven by a servo motor 51 mounted on the frame 122 through the gear train generally labeled 119 to move the rack 118 upwardly or downwardly as oriented in the drawing. The rack is slidably supported and guided in any suitable manner such as in the journal block 125 on frame 122. As will be readily appreciated, as the rack 118 moves, it causes lever 110 to pivot about pin 111 to thereby move die core 48 in a direction opposite to the movement of rack 118.

It is to be noted that the interior of the die shell 46 and the exterior of core piece 48b and end piece 48c on the lower part of the die core 48 are formed to produce the desired configuration of plastic being extruded. In the embodiment shown, the core piece 48b, the end piece 48c and the die shell 46 shape the extrusion into the form of a tube 13. Note also that the die shell 46 is clamped in position by clamps 49a and is laterally adjustable with respect to the body or housing 41.

Since the plastic material forming tube 13 passes around the enlarged end portion 48c of the die core 48b, the internal diameter of the tube 13 remains constant. However, the external diameter of the tube 13 is varied by moving the die core 48, and hence moving the core piece 48b and the enlarged end portion 48c, to vary the opening of the orifice 44 to permit more or less plastic to pass through the orifice during a given period.

Thus, it will be apparent that should the die core 48 be moved upwardly so that the enlarged end 48c is aligned with the orifice 44, the effective cross section of the orifice 44 would be reduced. The foregoing would result in the tube 13 having a reduced wall thickness while maintaining the same internal diameter. The wall thickness of the tube 13 may be changed during an extrusion process without stopping the extrusion process. The foregoing change may be accomplished by continuing the extrusion of the material while varying the position of the die core 48 and, hence, of die core piece 48c for varying the opening of orifice 44. Further, it will be apparent that the pivot lever 110 will control the movement of and positioning of die core 48. As is obvious, it is necessary that the control of the die core 48, and the opening of the orifice 44 be adjusted in timed relation to the operation of the molding machine to form an article having selected wall thickness along various portions of its length. This feature of the invention will be described hereinbelow.

The circuit for controlling the operation of the servo motor 51, which drives the lever 110, and hence positions the die core 48, will now be described by reference to FIG. 4. FIG. 4 shows a function generator 52, which comprises, in essence, a voltage divider matrix. A plurality of electrical lines or leads indicated generally as 68 are arranged to be connected to an impedance element in the form of a resistor 54. Lines 68 are arranged in spaced, electrical relation on resistor 54 to connect to different resistive values and thus to provide a voltage dividing function for purposes to be explained. In one embodiment of the invention, a voltage of about twenty volts is impressed across the impedance element or resistor 54 and the leads are connected to provide voltages at stepped one-half volt intervals.

A plurality of adjustably connectable electrical lines or leads, indicated generally as 71, are arranged to be selectively connected to lines or leads 68 by suitable movable terminals, or pin connectors indicated by the arrows on the lines 71. The lines 68 and 71 form a rectangular matrix configuration of horizontally and vertically positioned lines, as oriented in FIG. 4. As mentioned, the lines 71 are effectively movable to be selectively connected to lines 68 for purposes to be described. One such function generator found suitable for use with this invention and which includes a rack or board having manually adjustable and slidable pin connectors is the so-called Vernistat Adjustable Function Generator manufactured by the Vernistat Division of Perkin-Elmer Corp., Norwalk, Conn.

The lines 71 terminate in a rotary switch 72 that may be of any suitable known construction. Switch 72 comprises a plurality of spaced stationary terminals, generally labeled 73, and a rotatable rotor 74 on which is mounted an electrical contact member 75. As is known, as the rotor 74 is caused to rotate, the contact 75 closes an electrical contact with each of the terminals 73 in stepped and timed sequence.

A modification of the switch 72 is shown as switch 72' in FIG. 5. In FIG. 5 each of the switch terminals 73 of rotary switch 72 in FIG. 4 comprise a so-called reed switch 173 having a pair of magnetically actuable contacts 175 and 176. A rotor 74' corresponding to the rotor 74 of rotary switch 72 comprises a permanent magnet 174 which when rotated to a position adjacent a switch 173 causes the electrical contacts 174 and 175 of the switch 173 to close and thus make electrical contact. The rotor 74 or 74' of the rotary switch 72 or 72' may be driven directly from the main shaft 6 of the molding machine by a suitable cogged timing belt 80 and timing pulleys 70 and 70a, as shown in FIG. 6. Note that FIG. 6 shows a portion of the molding machine as shown in FIG. 2 of the above-mentioned Negoro patent. The contact 175 of each reed switch 173 connects to a respective one of lines 71 as will be referred to later with respect to FIG. 7 and each switch contact 176 connects to lead 76. The function of rotary switches 72 and 72' as concerns the operation of the circuitry of the invention is substantially identical, hence in the following description reference will be made only to switch 72, and it will be understood that the description applies equally well as concerns switch 72'.

Refer now to FIG. 7 which shows the electrical control circuitry of the invention including the function generator 52 and servo motor 51 arranged to control the positioning of the extrusion die core 48 shown in FIG. 1. The servo motor 51 is an A.C. servo motor of any suitable known construction. The operation of the servo motor 51 is controlled by selectively programming the adjustable function generator 52. For purposes of clarity in the drawing and in explanation, the showing of the function generator 52 of FIG. 4 has been abbreviated and, hence, simplified as shown in the upper left-hand portion of FIG. 7.

As shown in FIG. 7, the resistor 54 of function generator 52 has one terminal 55 connected through a lead 57 to one terminal 59 of the secondary winding 62 of a transformer 60. The other terminal 56 of resistor 54 is connected through lead 63 to the other terminal 64 of secondary winding 62. A center tap 65 on resistor 54 is connected to ground reference; likewise, a center tap 66 on secondary winding 62 is also connected to ground reference.

The rotor 74 of switch 72 is electrically connected through lead 76 and an amplitude control potentiometer 77 to ground reference. A tap 79 on potentiometer 77 is connected through a potentiometer 81 and leads 83 and 84 to a servo amplifier 85 of any suitable known type arranged to provide a signal to drive servo motor 51. Potentiometer 81 includes a tap 82 which provides a means for adjusting the resistance of the potentiometer 81 to match the input impedance o fthe amplifier 85.

Referring again to transformer 60, the secondary winding 62 of the transformer is also connected through the lead 63, and a bias control potentiometer 86 to ground reference. Potentiometer 86 includes a tap 87 which is connected through a resistor 88, and leads 89 and 84 to the servo amplifier 85. Note that the voltages derived across bias control potentiometer 86 and amplitude potentiometer 77 are combined before they are coupled to the servo amplifier 85.

The upper, as oriented in FIG. 7, terminal 59 of secondary winding 62 of transformer 60 is also connected through lead 57 to a winding 95 of a linear variable differential transformer 92 and thence to ground reference. The other windings 93 and 94 of the transformer 92 are connected in series through a potentiometer 96 to ground reference. A tap 97 of potentiometer 96 is connected through leads 98 and resistor 99 to the servo amplifier 85. As will be explained, transformer 92 provides a feedback signal to the servo amplifier 85.

The transformer 60 is energized from any suitable alternating current source (not shown) through electrical lines 101 and 102 which are connected across primary winding 61. Likewise, the amplifier 85 may be energized through lines 103 and 104 from the same source.

Before describing the operation of the control circuit of FIG. 7, it may be desirable to view the operative relation of the circuit of FIG. 7 with respect to the other units of the over-all system. Referring to FIG. 8, the molding machine, as it operates, drives the rotary switch 72 which is the synchronizing unit for the control circuit of FIG. 7 to sequentially connect it to the programmed leads 71 of function generator 52. The function generator 52 of the control circuit of FIG. 7 which has been programmed to provide selected signal outputs drives the servo motor 51 in accordance with the program. The feedback signal assists in controlling the operation of the servo motor 51; the motor 51, in turn, moves or modulates the extrusion die core 48 to control the amount of plastic flowing through the die orifice 44. A section of tube 13 is extruded and a mold 15 is activated to seal and cut-off that given section of the tube. The tube 13 is next expanded to form the article defined by mold 15. The molding machine is timed to initiate its next operation and the foregoing cycle is then repeated for a succeeding section of tubing and the succeeding mold.

Referring now to the operation of the circuit of FIG. 7, assume first that the A.C. source is connected to the circuit through input lines 101 and 102. Assume also that the vertical leads 71 of the function generator 52 have been selectively positioned, that is, programmed, to contact selected ones of the horizontal leads 68 of the generator 52 in accordance with the thickness of the walls desired on each specific portion of the article being molded.

Initially, a basic or medium thickness for the wall of the article being formed is established by adjusting tap 87 on bias control potentiometer 86 to position the die core 48, and, hence, the core piece end 48c at a desired null position. Any wall thickness varying from the basic thickness desired for each portion of the article is provided by setting the vertical leads 71 to contact selected ones of the horizontal leads 68. The thickness of the walls at the extreme ends of the article may be programmed by the two extreme outside leads 71a and 71h. The thickness of the walls of the article intermediate the ends of the article is controlled or determined by the setting of leads 71b through 71g, and each lead controls the thickness of a respective portion of the article wall. For example, the setting or programming of function generator 52 (as shown in FIG. 4) is representative or corresponds to the tubing 13 and the bottle 50 as shown in FIGS. 2, 3 and 9.

The time required for the switch 72 to rotate and sequentially couple lead 76 to all of the leads 71a through 71h is synchronized with the operation of the over-all molding machine as stated above, so that a section of tube 13 to be received by one of the molds 15 is extruded during the period required for switch 72 to sequentially couple to all of the leads. As mentioned above, switch 72 may be driven directly from the main shaft 6 of the molding machine, as shown in FIG. 6.

It should be appreciated that the function generator 52 actually controls the thickness of discrete specific portions of the wall of the section of an extruded tube 13, as shown in FIGS. 2 and 3, which tube is then expanded to form a bottle 50 with walls of desired variable thickness. The entire length of the article wall thickness or cross section is thus entirely programmed by the setting of the vertical leads.

Assume that at a given point of the tube extruding operation, the contact member 75 of rotary switch 72 is contacting terminal 73a which is connected through lead 71a to horizontal lead 68f (as shown in FIG. 7). With the foregoing connection of lead 71a to lead 68f, the voltage applied through transformer 60, function generator 52, rotary switch 72, potentiometer 85, and amplifier 85, to servo motor 51, will be an effective zero or null voltage. Hence, the only voltage applied to the servo motor 51 will be developed across the bias control potentiometer 86. Accordingly, servo motor 51 will remain in its null position and the die core 48 will remain in its initial position to permit an amount of plastic to pass through the orifice 44 to provide the selected basic or medium wall thickness.

As the rotor 74 of rotary switch 72 is caused to continue to rotate, contact member 75 is moved into electrical contact with terminal 73b which, as shown in FIG. 7, is connected through leads 71b and lead 68d to resistor 54. At this point, a relatively positive voltage will be coupled from transformer 60 through resistor 54, lead 68d, lead 71b, contact member 75, rotor 74, lead 76, and potentiometer 77 to ground reference. The voltage developed across potentiometer 77 will be a positive voltage which is combined with the voltage appearing across bias control potentiometer 86 and coupled to the servo amplifier 85 to drive the servo motor 51. The servo motor 51 is arranged to be driven by this voltage in a direction to move the extrusion die core 48 to make the opening of the orifice 44 effectively larger to permit relatively more plastic to pass through the orifice 44.

As the rotor 74 continues to rotate, differing voltages will be coupled from the transformer 60 through the function generator 52 to drive the servo motor 51 in one or the other direction to position the extrusion die core 48 to permit more or less plastic to be fed through the orifice 44.

Note that in FIG. 7 the resistor 54 of function generator 52 has its center tap 65 connected to ground reference; likewise, transformer 60 has its center tap 66 connected to ground reference. The horizontal lead 68f is connected to ground reference, the horizontal leads 68a through 68e are connected above ground reference, and horizontal leads 68g through 68k are connected below ground reference. The vertical leads 71e, 71f, and 71g, which in FIG. 7 are shown as connected to the horizontal leads 68h, 68i and 68j, respectively, thus cause a voltage to be developed across amplitude potentiometer 77 which combines and, in effect, subtracts from the voltage on bias control potentiometer 86. The combined voltage developed across potentiometer 86 and amplitude control potentiometer 77 is thus less than the bias voltage; accordingly, the servo motor 51 is driven in a direction to move the die core 48 to decrease the opening of the orifice 44 and hence to decrease the amount of plastic fed through the orifice.

For purposes of simplicity in explaining the instantaneous current flow paths of the circuit of FIG. 7, assume that at the given instant, a negative half cycle of the A.C. signal is effective across transformer 60. It will be understood that the operation of the circuit during the positive half cycle of the A.C. input signal can also be explained in a similar manner.

Assume the terminal 59 of secondary winding 62 of transformer 60 is negative; that terminal 64 is positive; that lead 71c is connected to lead 68c; and, that contact member 75 is contacting terminal 73c. A current will be caused to flow through potentiometer 86 in a direction to couple a positive voltage to amplifier 85. At the same instance, the negative potential on the upper terminal 59 will cause a current to flow from ground reference through a path which may be traced from amplitude control potentiometer 77, lead 76, rotor 74, contact member 75, lead 71c, lead 68c, a portion of resistor 54, terminal 55, lead 57, the upper portion of secondary winding 62, and terminal 66 to ground reference. The current flow through potentiometer 77 is thus in such a direction that a voltage will be developed across potentiometer 77 which is in opposition to the voltage developed across bias control potentiometer 86. The voltages developed across potentiometer 77 and 86 will be combined at lead 84 and coupled to servo amplifier 85 to drive servo motor 51 in a direction to move the extrusion head 12 to increase the opening of the orifice 44 to permit more plastic to pass through the orifice at that instant.

Assume next that lead 71 is connected to a horizontal lead 68 which is below horizontal line 68f; for example, assume line or lead 71e is connected to lead 68h and contact member 75 of rotor 74 is in position contacting terminal 73e. During the aforementioned polarity relation, when the terminal 64 of secondary winding 62 is positive and terminal 69 is negative, a current will be caused to flow in bias control potentiometer 86 to develop a positive voltage thereacross. Likewise, a positive voltage will be developed in potentiometer 77 by a current flowing in an electrical path which may be traced from terminal 64, lead 63, terminal 56, a portion of resistor 54, lead 68h, lead 71e, contact member 75, rotor 74, lead 76 and potentiometer 77. The voltages developed across potentiometers 86 and 77 will be combined on lead 84 and coupled to the servo amplifier 85. The two combined voltages together provide a more positive voltage than the bias control voltage provided by potentiometer 86 only. The combined voltages will tend to drive the servo motor 51 in a direction to decrease the opening of the orifice 44 to reduce the amount of plastic extruded into the mold 15 at this instant. In one embodiment, the servo motor 51 is controlled to rotate less than 360 degrees in either direction from its null position and, yet, effect proper positioning of the die core 48.

The over-all circuitry of FIG. 7 thus effects a continuous modulation of the opening of orifice 44 to thereby continuously control the amount of plastic passing through the orifice 44 to form tubing with desired selected variable wall cross section and, hence, to permit forming of articles of desired selected wall thicknesses.

The linear variable differential transformer 92 is mounted on the frame 122 as shown in FIG. 1 and is connected to provide a feedback signal for the circuit of FIG. 7. As the servo motor 51 drives the gear assembly 120 to move rack 118 up or down, a movable core sensor 91 in transformer 92 is correspondingly moved by contact with the upper end of the rack, see also FIG. 1. Movement of the core sensor 91 causes a voltage to be developed in transformer 92 in accordance with said movement, as is well-known in the art. The voltage thus developed by the core sensor 91 is coupled through potentiometer 96, lead 98 and resistor 99 to the servo amplifier 85 for comparison with the original signal fed to amplifier 85 through lead 84. The original signal and feedback signal are compared to effect accurate positioning of the die core 48. The feedback control potentiometer 96 is adjustable to adjust the speed of response of the core piece 48.

A method of setting up the operation of the invention for forming of an article is as follows:

First, the function generator 52 is set up such that a hump is produced in the center of the board of the function generator 52. For example, with reference to FIG. 4, the function generator 52 is set with the centermost lead 71m to be the most positive and the leads to either sides of the lead 71m to be posititioned in gradually decreasing order. This will produce a hump of plastic in the approximate, if not exact, position of the extruded tube to be used as a reference to correspond with the center of the mold. The molding machine is then energized to operation. The molded articles such as the bottle 50 are now examined to determine the location of the heavy band 50' resulting from the hump of plastic in the extruded tube. If the heavy band of plastic is displaced from the center of the molded article and hence the mold, the entire body of rotary switch 72 is rotatively adjustably positioned until the hump of plastic on the extruded tube is positioned in the center of the mold when the mold is closed. After the heavy band 50' on the bottle wall has served its purpose it is programmed out by moving the lead 71m and the adjacent leads back to their normal position for a normal bottle. The foregoing positioning of the rotary switch 72 will thus synchronize the output signals of function generator 52 to the operation of the molding machine.

The bias control potentiometer 86 sets the null position of the servo motor 51 and, hence, the medium position of the die core 48 relative to the orifice 44. The bias control potentiometer 86 thus adjusts for the desired basic or medium thickness of the wall of the plastic tube 13.

The feedback potentiometer 96 is set to control the sensitivity of the motor 51 and, hence, of die core 48 in following the pattern established by the programmed leads 71 of the function generator 52. If the response of the motor 51 appears to be too sluggish; that is, if the motor 51 does not actuate die core 48 to respond fast enough to the programmed pattern, then the feedback signal is increased by adjusting the potentiometer 96. If the action of the die core 48 appears to be too erratic or too fast, then the feedback signal is decreased by adjustment of the potentiometer 96.

The function generator 52 is programmed for the desired bottle shape, as for example shown in FIG. 4. As mentioned above, programming merely requires a setting of the terminal pins of the leads 71. The amplitude potentiometer 77 is set to vary the amount of stroke of the die core 48 in relation to the die orifice 44 and thus controls the desired over-all wall thickness of the article being made.

By an operation which may advantageously be a "cut-and-try" type of operation, fine adjustments may be made to obtain the desired distribution of plastic in the molded articles by cutting apart and examining a series of molded articles and resetting the terminal pins of the leads 71 as found to be necessary. The wall thickness can thus be modified or even completely changed in this expeditious, thus inexpensive and efficient manner.

The adjustment of the bias control, the amplitude control, the feedback control, the setting of the function generator 52 may be repeated in order to produce the final desired bottle shape.

Also, as shown in FIG. 9, the function generator 52 may be very conveniently programmed to cause a band 50' of relatively thicker material to be formed in the finished article. The thickness of the band has been exaggerated in the drawing and, normally, need only be of such thickness that the band is visually discernible with respect to the adjacent wall section. The band 50' which may be of any desired width, may be used as a fine centering control or for any other product control purposes desired. Once the band has served its purpose it is readily programmed out of the article wall so that normal articles will thereafter be produced.

While the invention has been particularly shown and described with reference to a preferred embodiment thereof, it will be understood by those skilled in the art that various changes in form and details may be made therein without departing from the spirit and scope of the invention.

I claim:

1. A variable extrusion apparatus for continuously extruding plastic material to form an article having walls of varied cross section, said extrusion apparatus comprising:
   (a) an extrusion head having orifice means;
   (b) a die core associated with said orifice means; said die core and said orifice means being movable with relation to one another to vary the opening of said orifice means;
   (c) drive means for moving said die core and said orifice means relative to one another;
   (d) a function generator programmable in accordance with preselected parameters to provide selected output signals;
   (e) electronic control circuitry for said drive means, said control circuitry being energized in response to signals from said function generator;
   (f) feedback means for generating feed-back signals in response to the activation of said drive means and for coupling said signals to said control circuitry to control said drive means;
   (g) whereby articles of selected and variable cross section may be molded thereby.

2. A variable extrusion apparatus as in claim 1 wherein
   (a) said drive means comprises gearing mechanism; for moving and positioning said die core;
   (b) and wherein said programmable function generator comprises an impedance element and matrix of a first and second group of electrical leads;
   (c) said electrical leads of said first group being connected in respective spaced resistive arrangement on said impedance element;
   (d) said electrical leads of said second group being selectively connectable to the electrical leads of said first group whereby the desired cross section of a tube may be programmed; and,
   (e) means for coupling a voltage across said impedance element whereby said electrical leads of said first group and said impedance element provide a voltage dividing action; and,
   (f) switch means arranged to be driven to sequentially connect to each of said leads in said second group in stepped sequence to complete electrical paths from said impedance element through selected ones of the leads in said first group, and selected ones of the leads in said second group to provide sequential voltages to energize said motor means for moving said die core to provide a tube of selected wall cross section in accordance with the programmed function.

3. A variable extrusion apparatus as in claim 1 wherein
   (a) said drive means comprises a servo motor and wherein said electronic control circuitry further includes;
   (b) a resistor;
   (c) a first and second group of leads connected in a matrix arrangement;
   (d) said leads in said first group being connected in spaced resistive arrangement to said resistor;
   (e) switch means having a rotor activatable to sequentially connect to respective ones of said leads in said second group;
   (f) synchronizing means for driving said rotor in timed relation;
   (g) said rotary switch selectively connecting said leads in said second group to drive said servo motor; and,
   (h) a variable linear differential transformer arranged to be activated in accordance with the position of the die core to provide a feedback signal to said motor.

4. A variable extrusion apparatus as in claim wherein:
   (a) said drive means includes a motor and associated drive gearing; and
   (b) said feedback means includes a differential transformer having a core sensor, movable in response to the actuation of said gearing by said motor; and
   (c) wherein said feedback signals are continuously compared to said selected parameters to effect continuous control of said motor and thus accurate positioning of said die core and said orifice.

5. A variable extrusion apparatus as in claim 4, wherein
   (a) said function generator comprises an impedance element and a matrix of a first and a second group of electrical leads;
   (b) said first group of electrical leads being connected in spaced resistive arrangement on said impedance element;
   (c) said electrical leads of said second group being selectively connectable to the electrical leads of said first group; and said apparatus including
   (d) means for coupling a voltage across said impedance element whereby said electrical leads of said first group and said impedance element provide a voltage dividing action; and,
   (e) switch means arranged to sequentially connect to each of said leads in said second group in stepped sequence to complete electrical paths with the leads in said first group and said impedance element to sequentially provide selective signals to energize said control means to vary the opening in said orifice.

6. An apparatus as in claim 4 adapted to be used with a blow molding machine, wherein
   (a) said function generator has a first group of lines each connectable to provide a respective voltage, and a second group of lines, the lines in said second group being selectively connectable to the lines in said first group; and including
   (b) a rotary switch having a plurality of fixed terminals, a rotor member, and an output line, said rotor member being arranged to sequentially effect an electrical circuit between the lines in said second group and said output line; and, (c) said rotor member being connected to be driven by an associated blow molding machine in synchronism therewith.

7. A variable extrusion apparatus as in claim 4 wherein
(a) said motor has a null position and wherein;
(b) bias means are provided for said motor means to set the null position of said motor and thereby determine the initial position of said die core relative to said orifice and hence the medium thickness of the extruded tube; and
(c) amplitude control means are provided for said motor means to set the range of movement of the die core in responding to a selected program.

References Cited

UNITED STATES PATENTS

| | | |
|---|---|---|
| 2,627,087 | 2/1953 | Hendry. |
| 3,002,615 | 10/1961 | Lemelson. |
| 3,186,032 | 6/1965 | Harwood. |
| 3,217,360 | 11/1965 | Mason et al. |
| 3,283,362 | 11/1966 | Turner. |
| 2,954,775 | 10/1960 | Rodley et al. |
| 3,007,052 | 10/1961 | Hickman et al. |
| 3,148,231 | 9/1964 | Spencer. |
| 3,286,302 | 11/1966 | Doering _____ 18—21 |
| 3,292,208 | 12/1966 | Wood _____ 18—21 |

WILLIAM J. STEPHENSON, *Primary Examiner.*

UNITED STATES PATENT OFFICE
CERTIFICATE OF CORRECTION

Patent No. 3,368,241 February 13, 1968

Henry R. Williams

It is certified that error appears in the above identified patent and that said Letters Patent are hereby corrected as shown below:

Column 1, line 14, for "extending" read -- extruding --; column 12, line 35, after "claim" insert -- 1 --.

Signed and sealed this 8th day of July 1969.

(SEAL)
Attest:

Edward M. Fletcher, Jr.
Attesting Officer

WILLIAM E. SCHUYLER, JR.
Commissioner of Patents